United States Patent
Eppel et al.

(10) Patent No.: US 7,097,683 B2
(45) Date of Patent: Aug. 29, 2006

(54) FILTER ELEMENT WITH A DRAINAGE TUBE

(75) Inventors: Otto Eppel, Speyer (DE); Wolfgang Heikamp, Waldsee (DE); Markus Zuerker, Dudenhofen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 105 days.

(21) Appl. No.: 10/746,146

(22) Filed: Dec. 29, 2003

(65) Prior Publication Data

US 2005/0044827 A1 Mar. 3, 2005

Related U.S. Application Data

(63) Continuation of application No. PCT/EP02/06710, filed on Jun. 18, 2002.

(30) Foreign Application Priority Data

Jun. 27, 2001 (DE) ............................... 101 31 108

(51) Int. Cl.
*B01D 46/00* (2006.01)

(52) U.S. Cl. ........................ 55/423; 55/424; 55/428; 55/495; 55/510; 55/DIG. 17

(58) Field of Classification Search ............... 55/385.1, 55/392, 423, 425, 424, 428, 495, 501, 510, 55/DIG. 17; 418/88, DIG. 1

See application file for complete search history.

(56) References Cited

U.S. PATENT DOCUMENTS

| 2,934,166 A | * | 4/1960 | Rossum | ........................ 55/423 |
| 5,899,667 A | * | 5/1999 | Greer | .......................... 418/88 |
| 6,409,804 B1 | * | 6/2002 | Cook et al. | ................... 55/423 |

FOREIGN PATENT DOCUMENTS

| EP | 278 772 | 8/1988 |
| EP | 806 564 | 11/1997 |
| JP | 07-217577 | 8/1995 |
| JP | 09-072635 | 7/1997 |

OTHER PUBLICATIONS

Copy of International Search Report dated Mar. 3, 2003.

* cited by examiner

*Primary Examiner*—Duane Smith
*Assistant Examiner*—Jason M. Greene
(74) *Attorney, Agent, or Firm*—Crowell & Moring LLP

(57) ABSTRACT

A filter element (15), especially suitable for separating entrained oil from an air stream, having a drainage device (23) including a drainage tube (22) which is connected to an upper end disk (16) of the filter element (15) by a connector (24) which may include preferably releasable clip hooks (25). The resulting filter element with a drainage device is easy and economical to manufacture, and may have a modular construction in which the connector (24) and the drainage tube (22) are separate components so that the length of the drainage tube can be optimally matched to various filter dimensions.

7 Claims, 2 Drawing Sheets

FILTER ELEMENT WITH A DRAINAGE TUBE

CROSS REFERENCE TO RELATED APPLICATIONS

This application is a continuation of international patent application no. PCT/EP02/06710, filed Jun. 18, 2002, designating the United States of America, and published in German as WO 03/002233 A2, the entire disclosure of which in incorporated herein by reference. Priority is claimed based on Federal Republic of Germany patent application no. DE 101 31 108.7, filed Jun. 27, 2001.

BACKGROUND OF THE INVENTION

The present invention relates to a filter element for separation of a liquid, in particular an element for removing oil from air, having a drainage tube through which the separated liquid can be removed. In addition, the present invention relates to a drainage system comprising the drainage tube and to a filter device comprising a filter element according to the invention.

Filter elements for separating a liquid from a fluid stream are generally known in the art. They are used, for example, for removing oil from compressed air in compressed air systems which are supplied with air by an oil-lubricated compressor. Another possible application is for removing entrained oil from crankcase gases from an internal combustion engine. In filter elements through which fluid flows continuously from the inside to the outside, the separated liquid collects in the interior of the filter cartridge, which preferably has a cylindrical design, and is removed from there with suction via a drainage tube extending into the interior of the filter cartridge. This drainage tube may be an integral component of the upper end disk of the filter element, thus making it possible to secure it in the position required for suction removal. However, a filter element with a fixedly installed drainage tube is complicated to manufacture, which is why such filter elements are not very economical.

SUMMARY OF THE INVENTION

It is therefore an object of the invention to provide an improved drainage tube for a filter element.

Another object of the invention is to provide a drainage tube for a filter element which is easy and inexpensive to manufacture.

These and other objects are achieved in accordance with the present invention by providing a filter element for separating a liquid from a fluid, the filter element comprising an annular filter medium with lower and upper end disks on respective axial end faces thereof, the lower end disk closing off an interior space defined by the annular filter medium, the filter element further comprising a drainage tube which protrudes through the upper end disk into the interior space, wherein said drainage tube is provided with a connector engageable with a receiving element in the upper end disk to secure the drainage tube to the upper end disk, whereby the drainage tube and the connector form a drainage device.

The inventive filter element is characterized in that the drainage tube can be secured in the upper end disk by means of a connector. The drainage tube and connector together form the drainage device which can be manufactured as a separate part from the rest of the filter element. The connection to the end disk is preferably detachable, so that the drainage tube can be removed when replacing the filter element and can be inserted into the new filter element. This makes it possible to manufacture the replacement parts less expensively because the drainage device can be reused repeatedly.

In accordance with one preferred embodiment of the invention, the drainage device itself may be a standard part which is equipped with snap noses or clip hooks as connectors. These snap connectors or clip hooks can be manufactured as one-piece plastic parts, for example, which is why the drainage device can be manufactured inexpensively. Corresponding receptacles or receiving elements for the connector designed e.g. as clip hooks, can also be constructed easily in the end disk, e.g., through window-shaped openings.

However, the description of the connecting elements on the drainage tube and the receiving element on the end disk of the filter element should not be understood as restricting the scope to parts in the form of clip hooks being provided only on the drainage tube. The connecting element on the drainage tube may also take the form of a receptacle engaged, e.g., by clip hooks on the end disk.

According to one preferred embodiment, the drainage tube may be constructed in one piece with the connector. This one-piece drainage device can then be manufactured inexpensively, e.g., of synthetic resin material (plastic) by the injection molding technique. This makes it possible to eliminate additional costs.

In accordance with another advantageous embodiment, the connector is provided with a tubular stem which forms a part of the drainage tube, and which facilitates a plug-in type connection with the actual tube which forms the rest of the drainage tube. The resulting drainage device thus has an essentially modular design which also permits cost savings. The basic part which because of its geometric structure must be produced, for example, by the injection molding method then comprises the connector with the tubular stem connection. This basic part may be used for all sizes of filter elements because due to the ready adaptability of the length of the drainage tube plugged-in to the tubular stem connection, the same basic part may be applied to all uses. The drainage tube itself is a semifinished product, namely a tube which may be produced, for example, by extrusion molding. Therefore, this is an extremely advantageous part. This also makes it possible to reduce warehousing and inventory costs by requiring only a few basic parts for all filter variants.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DESCRIPTION OF PREFERRED EMBODIMENTS

Figure 1:
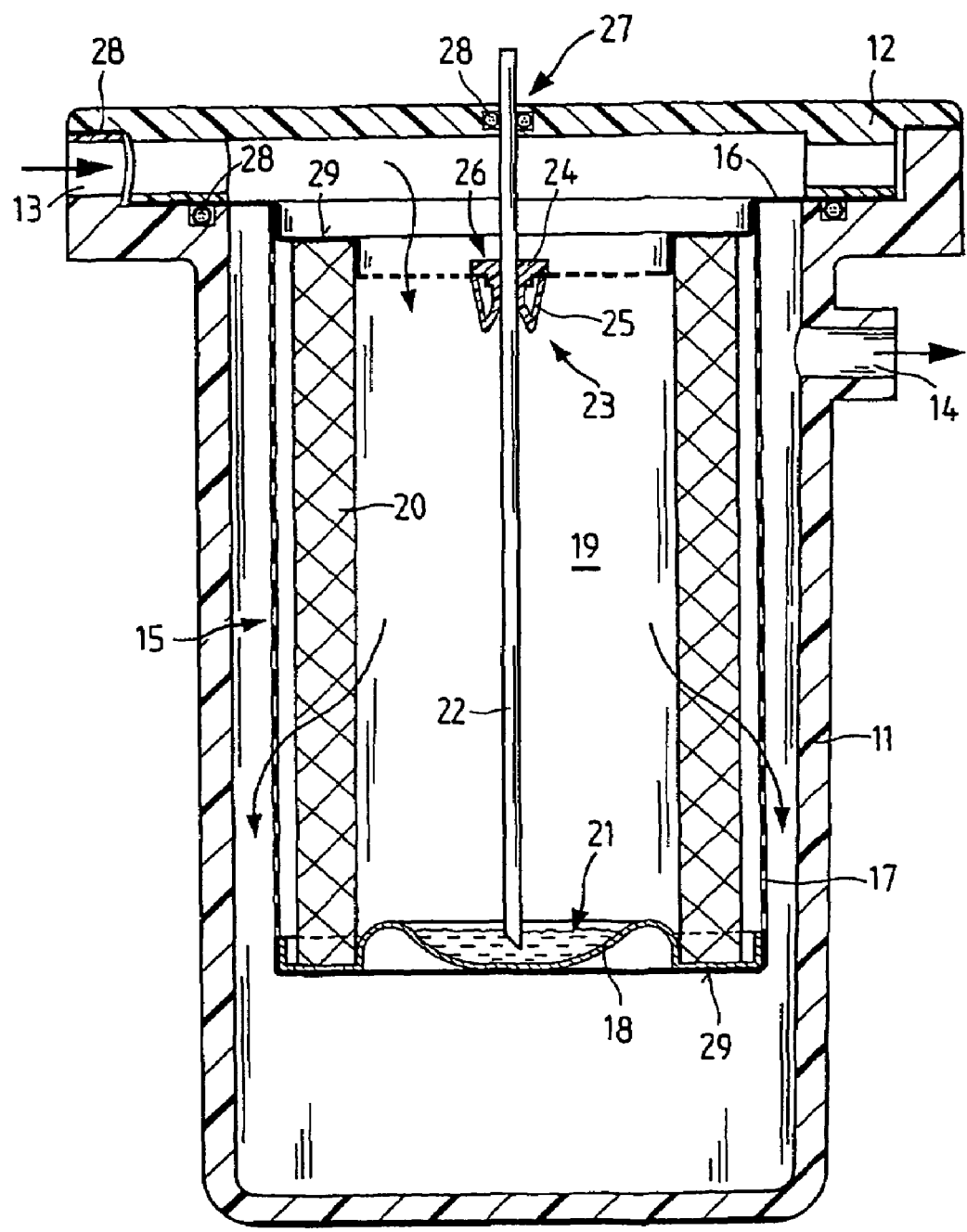
FIG. 1 is a sectional view through the center of an illustrative embodiment of a filter device according to the invention.

The filter device according to FIG. 1 has a housing 11 and a cover 12. An inlet 13 and an outlet 14 for the fluid to be filtered, in particular a gas, are formed through the housing. A filter element 15 is held in the housing 11 by clamping an upper end disk 16 of the filter element between the housing 11 and the cover 12. The filter element 15 also comprises a supporting body 17 for the filter medium 20 and a lower end disk 18.

The path of the gas to be filtered is indicated by arrows, extending from the inlet 13 through openings (not shown) in the upper end disk 16 into an interior space 19 of the filter element 15, from which the gas flow is directed through the filter medium 20 and the supporting body 17, which is also permeable, to the outlet 14. Liquid that is separated from the fluid during its passage through the filter medium 20 collects in a recess 21 in the lower end disk 18 and can be drawn out of the interior 19 through a drainage tube 22.

The drainage tube 22 is part of a drainage device 23 which also includes, among other things, a connector 24 with snap noses or clip hooks 25. The connector is thus designed as a stopper-shaped part which can be inserted into a hole-shaped receptacle 26 in the end disk. The connector is placed on the drainage tube 22 and is bonded to it, e.g. by adhesive bonding. Sealing rings 28 are used to seal the drainage tube at a passage 27 in the cover 12 and to provide a seal between the cover 12 and the housing 11. The filter medium 20 is sealed by bonding its end faces 29 to corresponding shoulders of the upper and lower end disks 16, 18.

Figure 2:
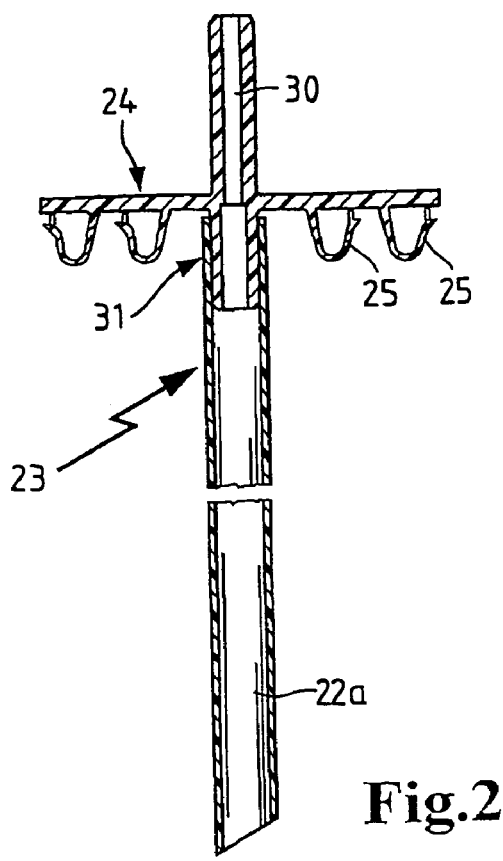
FIG. 2 is a cross-sectional view of a specific drainage device embodiment according to the invention.

FIG. 2 depicts an alternative embodiment of the drainage device 23. The connector 24 is provided with a tubular stem 30 which serves analogously to the drainage tube according to FIG. 1 as a connection for, e.g., a hose for suction removal of separated liquid. This connector is to be understood as a basic part and may be used for filter elements of different dimensions. In addition, a plug-in connection 31 formed on the connector 24 serves to connect the actual drainage tube 22a to the connector. The drainage tube 22a thus may be a standard semifinished product in the form of a tube and is cut to length from it. In this way the length of the drainage tube is freely selectable and can be adapted optimally to any given application.

Figure 3:
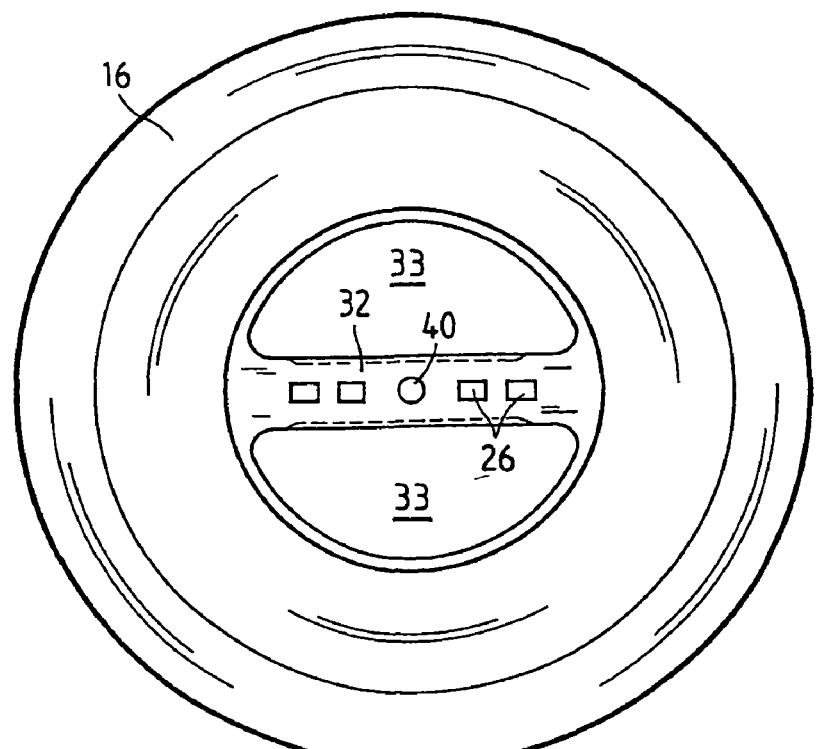
FIG. 3 is a top plan view of a cover into which the drainage device of FIG. 2 can be inserted.

FIG. 3 depicts an upper end disk 16, which can accommodate the drainage device 23. This shows a web 32 which bridges a through-opening 33 for the fluid to be filtered (not shown in FIG. 1). The drainage device 23 can be inserted into a central bore 40 in this web. Receiving elements in the form of window-shaped receptacles 26 serve to secure clip hooks 25 according to FIG. 2. Four of these clip hooks 25 and the respective receptacles 26 are arranged in a row. This makes it possible to achieve a reliable attachment. In addition, reliable mounting of the drainage device is also possible even if one of the snap noses or clip hooks breaks off.

Other connecting methods are of course also possible as alternatives to the clip-type connection depicted in FIG. 1 and FIG. 2. When the same material is used for the drainage device and the end disk, for example, a weld is one possibility. Another possibility is an adhesive connection. Instead of the clip hooks, for example, other connectors may also be used to establish releasable connections, e.g., nuts and bolts. A riveted connection is also conceivable. And finally, the possibility of a frictional or force-locking connection should also be mentioned, e.g., due to a press fit. This also makes it possible to achieve a seal.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for separating a liquid from a fluid, said filter element comprising an annular filter medium having axial end faces, and lower and upper end disks sealingly bonded to the respective axial end faces, the lower end disk closing off an interior space defined by the annular filter medium, said filter element further comprising a drainage tube which protrudes through the upper end disk into said interior space, wherein said drainage tube is provided with a connector engageable with a receiving element in the upper end disk to secure the drainage tube to the upper end disk, whereby the drainage tube and the connector form a drainage device.

2. A filter element according to claim 1, wherein said fluid is air, and said filter element is a de-oiling filter for separating entrained oil from the air.

3. A filter element according to claim 1, wherein the connector provided on the drainage tube is releasable from the upper end disk, whereby the drainage tube can be detached from the filter element.

4. A filter element according to claim 1, wherein the connector comprises at least one clip hook.

5. A filter element according to claim 1, wherein the drainage tube and the connector are constructed in one piece.

6. A filter element for separating a liquid from a fluid, said filter element comprising an annular filter medium with lower and upper end disks on respective axial end faces thereof, the lower end disk closing off an interior space defined by the annular filter medium, said filter element further comprising a drainage tube which protrudes through the upper end disk into said interior space, wherein said drainage tube is provided with a connector engageable with a receiving element in the upper end disk to secure the drainage tube to the upper end disk, whereby the drainage tube and the connector form a drainage device, and wherein the connector is equipped with a tubular stem which forms a plug-in connection with the drainage tube.

7. A filter device comprising a housing with an inlet for a fluid to be filtered and an outlet for filtered fluid to be filtered, and a filter element according to claim 1 secured in said housing between said inlet and said outlet.

* * * * *